(12) United States Patent
Kanegae et al.

(10) Patent No.: US 10,906,500 B2
(45) Date of Patent: Feb. 2, 2021

(54) PASSENGER PROTECTION APPARATUS

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 61 days.

(21) Appl. No.: 16/202,774

(22) Filed: Nov. 28, 2018

(65) Prior Publication Data

US 2019/0299910 A1 Oct. 3, 2019

(30) Foreign Application Priority Data

Mar. 28, 2018 (JP) .................. 2018-061873

(51) Int. Cl.
*B60R 21/233* (2006.01)
*B60R 21/231* (2011.01)
*B60R 21/239* (2006.01)

(52) U.S. Cl.
CPC ......... *B60R 21/233* (2013.01); *B60R 21/239* (2013.01); *B60R 21/23138* (2013.01); *B60R 2021/2395* (2013.01); *B60R 2021/23146* (2013.01); *B60R 2021/23308* (2013.01)

(58) Field of Classification Search
CPC ............ B60R 21/233; B60R 21/23138; B60R 21/239; B60R 2021/2395; B60R 2021/23308; B60R 2021/23146; B60R 2021/23192
USPC ..................................... 280/730.2
See application file for complete search history.

(56) References Cited

U.S. PATENT DOCUMENTS

| | | | |
|---|---|---|---|
| 3,795,412 A | 3/1974 | John | |
| 6,817,626 B2 | 11/2004 | Boll et al. | |
| 9,725,064 B1 | 8/2017 | Faruque et al. | |
| 9,744,932 B1 | 8/2017 | Faruque et al. | |
| 2002/0166710 A1* | 11/2002 | Breed | B60N 2/002 180/282 |

(Continued)

FOREIGN PATENT DOCUMENTS

| | | | |
|---|---|---|---|
| DE | 102014213296 A1 | 1/2016 | |
| FR | 2667831 A1 * | 4/1992 | ........... B60R 21/232 |

(Continued)

OTHER PUBLICATIONS

Office Action for Japanese Patent Application No. 2018-061873 dated Aug. 27, 2019 (4 pages in Japanese with English Translation).

(Continued)

*Primary Examiner* — James A English
*Assistant Examiner* — Kurtis Nielson
(74) *Attorney, Agent, or Firm* — Smith, Gambrell & Russell, LLP

(57) ABSTRACT

A passenger protection apparatus includes an inflator and an airbag. The inflator configured to supply gas and the airbag is configured to deploy to surround a sitting position, of a passenger by the gas supplied from the inflator. One end of the airbag is supported on an upper portion of a vehicle. The airbag includes a main airbag configured to deploy around the sitting position of the passenger, and a sub-airbag configured to deploy on an inner wall surface of the main airbag.

16 Claims, 6 Drawing Sheets

(56) References Cited

U.S. PATENT DOCUMENTS

| | | |
|---|---|---|
| 2004/0188988 A1 | 11/2004 | Wipasuramonton et al. |
| 2009/0295131 A1 | 12/2009 | Kim |
| 2013/0001934 A1 | 1/2013 | Nagasawa et al. |
| 2017/0267204 A1* | 9/2017 | Farooq .................... B60N 2/14 |
| 2017/0291569 A1* | 10/2017 | Sugie ................ B60R 21/01552 |
| 2019/0016293 A1* | 1/2019 | Saso ..................... B60R 21/264 |
| 2019/0071046 A1* | 3/2019 | Dry .................... B60R 21/2342 |
| 2019/0152359 A1* | 5/2019 | Spahn ................ B60R 21/0136 |
| 2019/0176739 A1* | 6/2019 | Song ..................... B60R 21/207 |
| 2019/0241141 A1 | 8/2019 | Sirous |
| 2019/0275974 A1* | 9/2019 | Yetukuri ............... B60R 21/231 |
| 2019/0275979 A1* | 9/2019 | Dry .................. B60R 21/23138 |
| 2019/0299916 A1 | 10/2019 | Kanegae |
| 2019/0337479 A1 | 11/2019 | Hill |
| 2019/0381968 A1* | 12/2019 | Kwon ..................... B60N 2/04 |
| 2020/0017059 A1 | 1/2020 | Choi |
| 2020/0070763 A1* | 3/2020 | Hill ...................... B60R 21/214 |

FOREIGN PATENT DOCUMENTS

| | | | |
|---|---|---|---|
| FR | 2667831 A1 | 4/1992 | |
| JP | 2004-106772 A | 4/2004 | |
| JP | 2004106772 A * | 4/2004 | |
| JP | 2010-247661 A | 11/2010 | |
| JP | 2013-014176 | 1/2013 | |
| JP | 2015-067123 | 4/2015 | |
| JP | 2017/100552 A | 6/2017 | |
| JP | 2009/001177 A | 1/2019 | |
| WO | 2012/144748 A2 | 10/2012 | |
| WO | WO-2012144748 A2 * | 10/2012 | ........... B60R 21/233 |
| WO | 2015/145285 A1 | 10/2015 | |

OTHER PUBLICATIONS

Japanese Office Action dated Sep. 3, 2019 for Japanese Patent Application No. 2018/061872 (4 pages in Japanese with English Translation).

* cited by examiner

PASSENGER PROTECTION APPARATUS

The present application claims priority from Japanese Patent Applications No. 2013-061873 filed on Mar. 28, 2018, and the entire contents of which are hereby incorporated by reference.

BACKGROUND

1. Technical Field

The present invention relates to a passenger protection apparatus.

2. Related Art

In order to protect a passenger from a collision and so forth, a seatbelt apparatus and an airbag apparatus have been used in a vehicle such as an automobile. As this airbag apparatus, a front airbag configured to deploy backward in front of the passenger has been known. This front airbag is deployed at a frontal collision of the vehicle to support and protect the passenger moving forward, which is disclosed, for example, in Japanese Unexamined Patent Application Publication No. 2033-014176.

Meanwhile, a curtain airbag used for a lateral collision of the vehicle has been known. This curtain airbag is deployed in the front-to-rear direction of the vehicle along the insides of the lateral surfaces of the vehicle at a lateral collision, and configured to receive and support the passenger moving outward in the vehicle width direction to protect the passenger at the lateral collision, which is disclosed, for example, in Japanese Unexamined Patent Application Publication No. 2015-067123.

SUMMARY OF THE INVENTION

An aspect of the present invention provides a passenger protection apparatus including an inflator configured to supply gas, and an airbag configured to deploy to surround a sitting position of a passenger by the gas supplied from the inflator. One end of the airbag is supported on an upper portion of a vehicle. The airbag includes a main airbag configured to deploy around the sitting position of the passenger, and at least one sub-airbag configured to deploy on an inner wall surface of the main airbag.

DETAILED DESCRIPTION

Hereinafter, an example of the present invention will be described with reference to the drawings.

Collisions with the vehicle are not limited to a frontal collision and a lateral collision, but various types of collision in any direction, such as an oblique collision, are conceivable. However, it may not be possible to prepare airbags for each type of collision, because of the high cost and so forth. In addition, the airbag needs to be supported at a predetermined position in order to reliably protect the passenger.

It is desirable to provide a passenger protection apparatus capable of coping with various types of collisions to improve a passenger protection function.

<Configuration of Vehicle 1>

Figure 1:
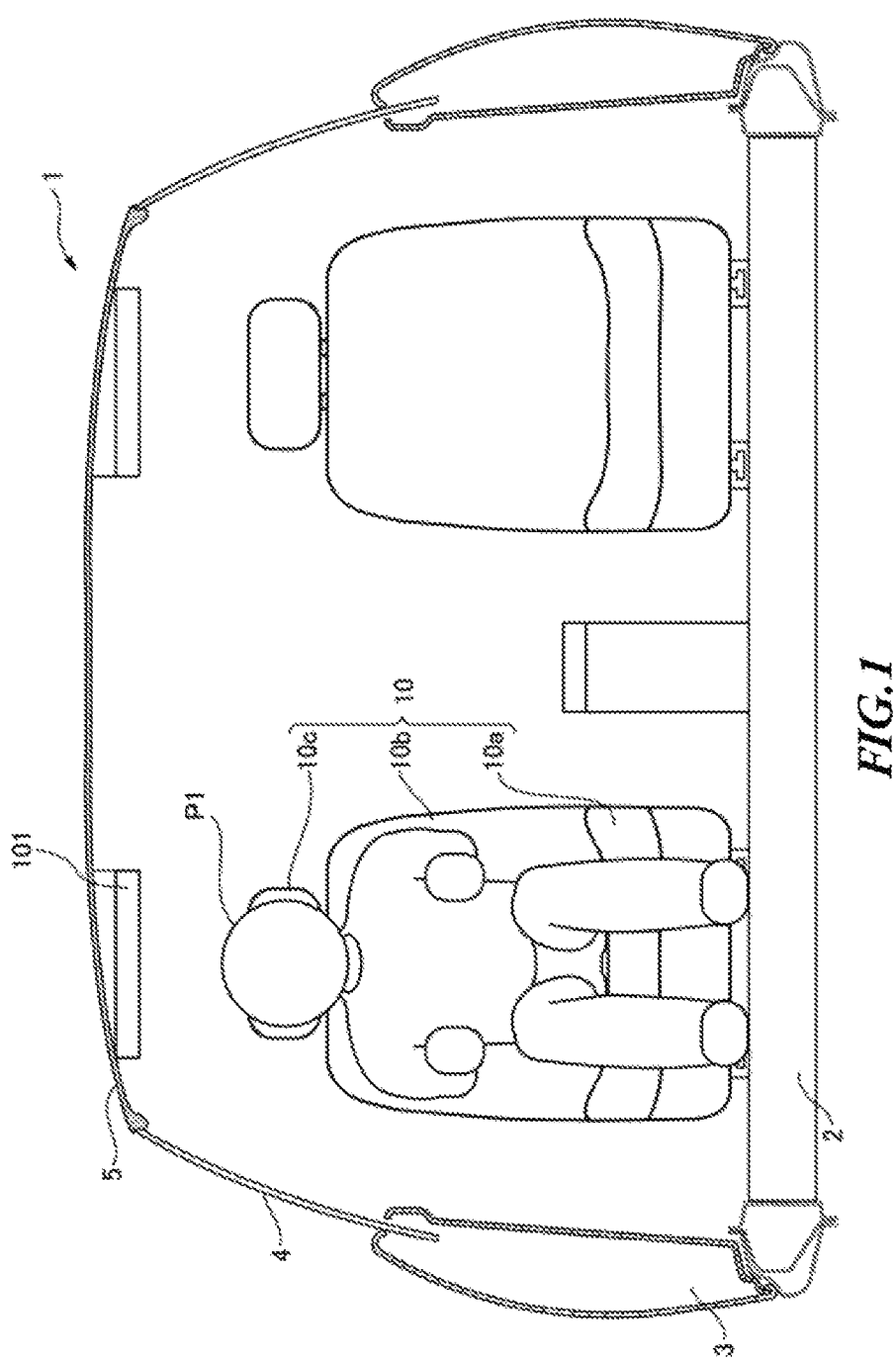
FIG. 1 is a cross-sectional view illustrating an exemplary vehicle equipped with a passenger protection apparatus according to an example of the present invention.
Figure 2:
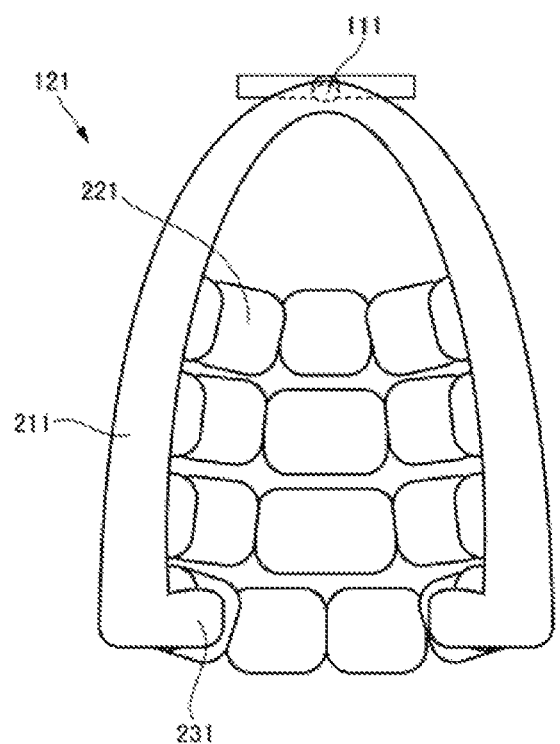
FIG. 2 is a cross-sectional view illustrating a state where the passenger protection apparatus according to an example of the present invention is actuated.

First, the configuration of a vehicle equipped with the passenger protection apparatus according to an example of the present invention will be described. FIG. 1 is a cross-sectional view illustrating a vehicle equipped with the passenger protection apparatus according to an example of the present invention. FIG. 2 is a cross-sectional view illustrating a state where the passenger protection apparatus according to an example of the present invention is actuated.

As illustrated in FIG. 1, seats 10 are mounted to a floor surface 2 of a vehicle 1. Body sides 3 constituting part of the side frame of the vehicle 1 are vertically provided on the right and left sides of the vehicle 1. Pillars 4 extend upward from the body sides 3 to support a ceiling 5 in an approximately horizontal position.

A passenger protection apparatus 101 is provided on the ceiling 5, above each of the seats 10 in the vehicle 1. The seats 10 are, for example, a driver seat and a front passenger sear, arranged in the width direction of the vehicle 1, and the same passenger protection apparatus 101 is provided above each of the seats 10. With the present example, the passenger protection apparatus 101 provided above the driver seat (seat 10) in the vehicle 1 with the steering wheel on the right side will be described.

The seat 10 includes a seat bottom 10a on which the hip and thighs of a passenger P rest, a reclining backrest 10b, and a head 10c configured to support the head of the passenger P.

<Configuration of Passenger Protection Apparatus 101>

Next, the configuration of the passenger protection apparatus 101 according to an example of the present invention will be described. Here, with the present example, the passenger protection apparatus 101 is controlled by, for example, an ACU (airbag deployment control unit) and an ECU (electronic control unit). The passenger protection apparatus 101 includes an inflator 111 and an airbag 121.

<Inflator 111>

The inflator 111 ignites explosives upon receiving a signal from an abnormality detector detecting an abnormality of the vehicle 1 such as a collision, or collision prediction, and generates gas by the chemical reaction due to combustion, and then injects the gas into the airbag 121. That is, the inflator 111 is configured to supply the airbag 121 with gas.

<Airbag 121>

The airbag 121 has a pouch-shaped body into which the gas is injected by the inflator 111. When the airbag 121 is not actuated, it is compactly folded. One end of the airbag 121 is held by the passenger protection apparatus 101 fixed to the ceiling 5 of the vehicle 1. That is, one end of the airbag 121 is held in the upper portion of the vehicle 1.

The airbag 121 includes a main airbag 211, sub-airbags 221, and lock bags 231. The main airbag 211 is hollow and has an approximate conical pouch-shaped body to entirely cover the passenger P1. One end of the main airbag 211 is held in the upper portion of the vehicle 1. In addition, when the main airbag 211 is deployed and expanded, the size of the main airbag 211 is large enough to cover the seat bottom 10a of the seat 10 and extend to the level lower than the lower portion of the seat bottom 10a.

The inflator 111 supplies the gas into the main airbag 211 to deploy the main airbag 211. Here, with the present example, the main airbag 211 has an approximate conical shape. However, this is by no means limiting, and the main airbag 211 may have an approximate cylindrical, pyramid, or prismatic shape.

A plurality of sub-airbags 221 are provided in the hollow main airbag 211 along the inner wall surface of the main airbag 211. The sub-airbags 221 are supplied with the gas from the inflator 111. Here, the gas supply selector 141 selects the sub-airbags 221 and allows the gas to be distributed among the selected sub-airbags 221, so that the sub-airbags 221 are deployed individually. Here, with the present example, the shape of the sub-airbag 221 is illustrated as an approximately square pole with rounded corners. However, this is by no means limiting, and the shape of the sub-airbag 221 may be approximately circular, triangle, or hexagonal.

The lock bags 231 are provided on the inner circumference of the lower portion of the main airbag 211. After main airbag deploys, the lock bags 231 deploy from the inner circumference of the lower portion of the main airbag 211 to contact the seat bottom 10a of the seat 10, and therefore can restrict the motion of the airbag 121 and hold the airbag 121 to the seat 10. Here, with the present example, one of the lock bags 231 is provided from the lower portion of the main airbag 211 on the right side, and the other of the lock bags 231 is provided from the lower portion of the main airbag 211 on the left side.

Communication paths are formed in the lower portion of the main airbag 211 to communicate with the lock bags 231. The gas supplied from the inflator 111 first flows into the main airbag 211, and then flows into the lock bags 231 from the main airbag 211 via the communication paths. Therefore, when the airbag 121 expands, the main airbag 211 first expands, and after that, the lock bags 231 expand.

Here, with the present example, the gas is flowed from the inflator 111 into the lock bags 231 via the main airbag 211. However, this is by no means limiting, and the inflators 111 may be individually provided for the main airbag 211 and the lock bags 231. In this case, the gas is flowed from the inflator 111 into the lock bags 231 later than when the gas is flowed into the main airbag 211, and therefore it is possible to expand the lock bags 231 later than when the main airbag body 211 expands.

In addition, with the present example, one of the lock bags 231 is provided from the lower portion of the main airbag 211 on the right side, and the other of the lock bags 231 is provided from the lower portion of the main airbag 211 on the left side. However, this is by no means limiting, and the lock bag 231 may be provided from the lower portion of the main airbag 211 on either side. Otherwise, one or more lock bags 231 may be provided in the front-to-back direction, in front of or behind the main airbag 211, or obliquely with respect to the main airbag 211. For example, the lock bag 231 may be annularly provided on the inner circumference of the lower portion of the main airbag 211.

Moreover, with the present example, the lock bags 231 simply deploy from the lower portion of the main airbag 211. However, this is by no means limiting, and the lock bags 231 may be pulled up. For example, a tether connecting to the ceiling 5 of the vehicle 1 may be provided, and pulled up as the lock bags 231 deploy. In addition, a reeler to reel the tether may be provided to pull up the tether as the lock bags 231 deploy. By this means, it is possible to surely lock the airbag 121 on the seat 10.

Moreover, with the present example, the lock bags 231 are provided from the lower portion of the main airbag 211. However, this is by no means limiting, and the lock bags 231 may be provided at the middle of the main airbag 211. For example, the lock bags 231 may be provided at the level of the head 10c and contact the head 10c to restrict the motion of the airbag 121.

Moreover, with the present example, the lock bags 231 contact part of the seat 10 to hold the airbag 121. However, this is by no means limiting, and the lock bags 231 may contact any in-vehicle member or part of the passenger P1 to hold the airbag 121.

Furthermore, with the present example, the lock bags 231 are provided as individual members. However, this is by no means limiting, and the lock bags 231 may be provided as the sub-airbags 221. For example, each of the lock bags 231 may be provided as one sub-airbag 221 and controlled individually.

<Function of Passenger Protection Apparatus>

Figure 3:
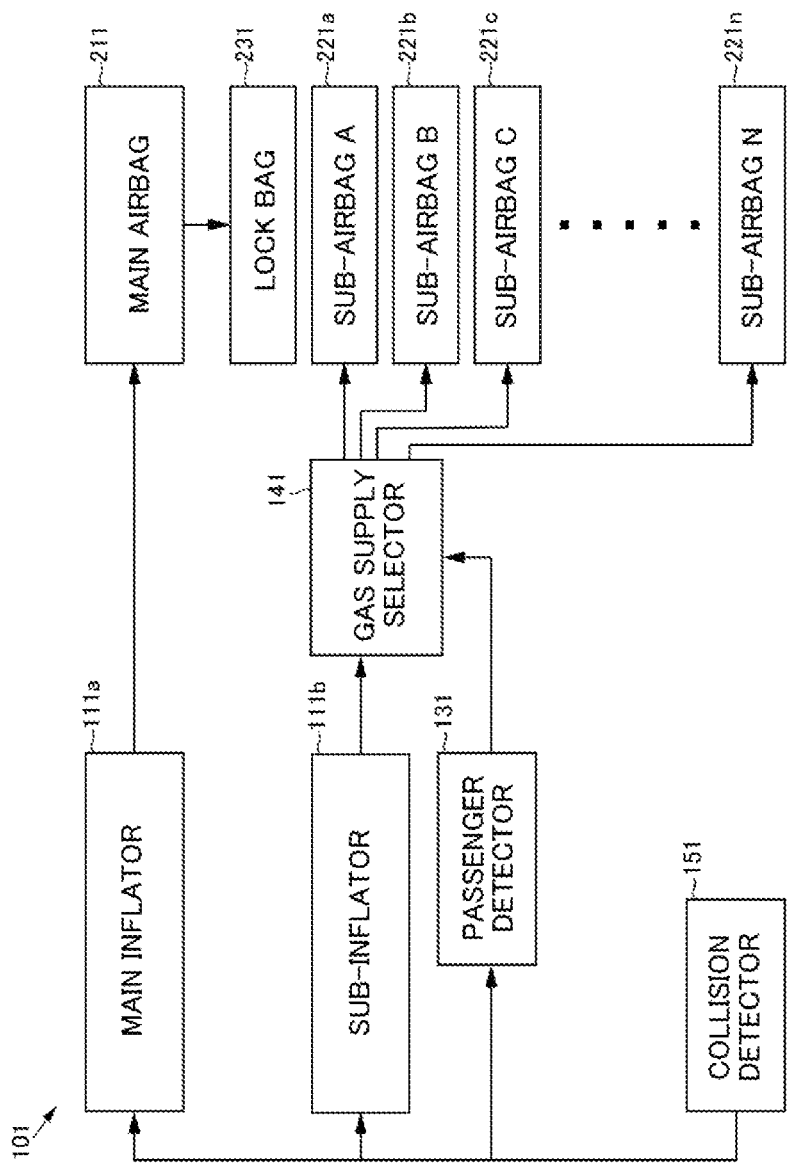
FIG. 3 is a functional block diagram illustrating the passenger protection apparatus according to an example of the present invention.

Next, the function of each of members of the passenger protection apparatus 101 will be described. FIG. 3 is a functional block diagram illustrating the passenger protection apparatus 101 according to the present example.

As illustrated in FIG. 3, the passenger protection apparatus 101 according to the present example includes the inflator 111, the airbag 121, a passenger detector 131, the gas supply selector 142 and a collision detector 151. The inflator 111 includes a main inflator 111a and a sub-inflator 111b. The airbag 121 includes the main airbag 211, a plurality of sub-airbags 221a to 221n, and the lock bags 231.

The main inflator 111a is configured to supply gas to the main airbag 211, based on a collision detection signal sent from the collision detector 151. Here, with the present example, the lock bags 231 are supplied with the gas via the main airbag 211. However, this is by no means limiting, and the lock bags 231 may be supplied with the gas directly from the main inflator 111a.

The sub-inflator 111b is configured to supply the gas to the sub-airbags 221a to 221n via the gas supply selector 141, based on a collision detection signal sent from the collision detector 151. Here, the lock bags 231 may be supplied with the gas from the sub-inflator 111b.

The passenger detector 131 is configured to detect the position of the passenger P1. To be more specific, the passenger detector 131 is configured to detect whether the passenger P1 sits on the seat 10; which of the seats 10 the passenger P1 sits on; and the posture of the passenger P1 sitting on the seat 10. In particular, the passenger detector 131 detects the direction of the passenger P1 sitting on the seat 10, the positions of the shoulders, and the position of the head of the passenger P1.

Upon receiving the collision detection signal from the collision detector 151, the passenger detector 131 sends the gas supply selector 141 a designation signal to designate the sub-airbags 221a to 221n to be deployed, based on information on the detected position of the passenger P1. Here, the passenger detector 131 may send the gas supply selector 141 information on the sub-airbags 221a to 221n which may need to be deployed, or information on the sub-airbags 221a to 221n which do not need to be deployed, based on the information on the detected position of the passenger P1, before the collision detection signal is sent from the collision detector 151.

The as supply selector 141 is configured to select the sub-airbags 221a to 221n to be supplied with the gas outputted from the sub-inflator 111b, based on the information sent from the passenger detector 131. To be more specific, when the gas is outputted from the sub-inflator 111b based on the collision detection signal from the collision detector 151, the gas supply selector 141 selects the destination of the gas supply, based on the designation signal sent from the passenger detector 131 to designate the sub-airbags 221a to 221n to be deployed, and allows the gas to be supplied to the designated sub-airbags 221a to 221n. Here, the gas supply selector 141 may allow the gas to be supplied to one or more sub-airbags 221a to 221n.

The collision detector 151 is configured to predict a collision of the vehicle 1 with an object or detect an object. When the collision detector 151 predicts a collision or detects an object, the collision detector 151 sends a collision detection signal to the main inflator 111a, the sub-inflator 111b and the passenger detector 131. The collision detector 151 predicts a collision by determining whether an object will contact the vehicle 1, based on, for example, the direction in which the object approaches the vehicle 1, and a relative acceleration to the object. Moreover, the collision detector 151 detects a collision of the vehicle 1 with an object, based on a detection signal from an acceleration sensor.

Here, with the present example, the collision detector 151 predicts and detects a collision of the vehicle 1 with an object. However, this is by no means limiting, and the collision detector 151 may either predict or detect a collision of the vehicle 1 with an object.

The main airbag 211 is configured to be deployed by the gas supplied from the main inflator 111a. When the main airbag 211 is deployed by the gas from the main inflator 111a, the seat 10 and the passenger P1 sitting on the seat 10 are entirely covered with the main airbag 211 as described above. The sub-airbags 221a to 221n are provided in the main airbag 211 along the inner wall surface of the main airbag 211. The lock bags 231 are provided on the inner circumference of the lower portion of the main airbag 211. The communication paths are formed in the main airbag 211 to communicate with the lock bags 231 to flow the gas from the main airbag 211 to the lock bags 231.

The sub-airbags 221a to 221n are supplied with the gas from the sub-inflator 111b. Here, the gas supply selector 141 selects the sub-airbags 221a to 221n and allows the gas to be distributed among the selected sub-airbags 221a to 221n, so that the sub-airbags 221a to 221n are deployed individually. The sub-airbags 221a to 221n are provided on the inner wall surface of the main airbag 211 at predetermined positions. Therefore, the passenger detector 131 designates the sub-airbags 221a to 221n to be deployed, based on the detected position of the passenger 21. Therefore, only when the sub-airbags 221a to 221n are designated by the passenger detector 131, the sub-airbags 221a to 221n are selected by the gas supply selector 141 and supplied with the gas by the sub-inflator 112b, so that the designated sub-airbags 221a to 221n are deployed. Here, one or more sub-airbags 221a to 221n may be designated.

The lock bags 231 are supplied with the gas from the main airbag 211 via the communication paths provided between the lock bags 231 and the main airbag 211, and are deployed. Therefore, the lock bags 231 are deployed later than when the main airbag 211 is deployed. Here, the lock bags 231 may be coupled directly to the main inflator 111a as described above, and be deployed by the gas supplied directly from the main inflator 111a. Alternatively, the lock bags 231 may be coupled to the sub-inflator 111b via the gas supply selector 141, and deployed by the gas supplied from the sub-inflator 111b. Otherwise, the lock bags 231 may be coupled directly to the sub-inflator 111b and deployed by the gas supplied directly from the sub-inflator 111b.

<Operation of Passenger protection apparatus 101>

Figure 4:
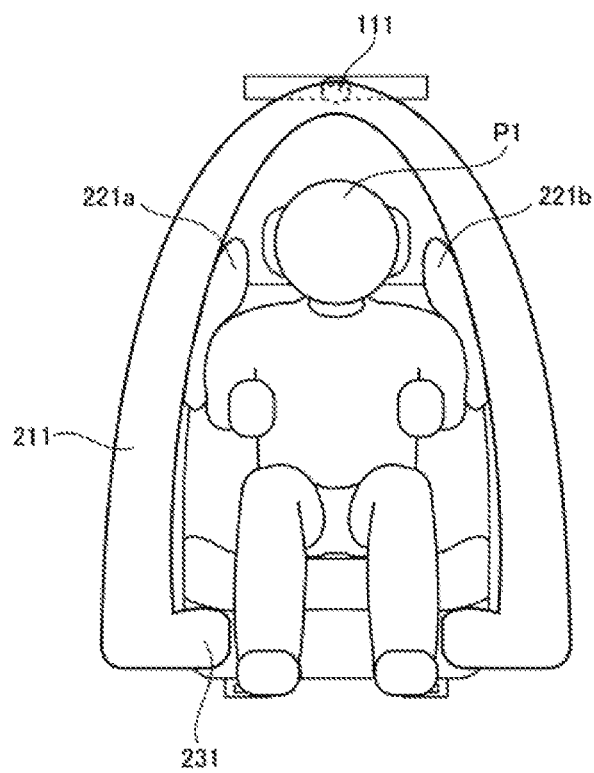
FIG. 4 is a cross-sectional view illustrating a state where the passenger protection apparatus according to an example of the present invention is actuated.

Next, the operation of the passenger protection apparatus 101 when the vehicle 1 collides with an object will be described. FIG. 4 is a cross-sectional view illustrating a state where the passenger protection apparatus 101 is actuated.

For example, in a case where the vehicle 1 is a gasoline-fueled vehicle, when an engine is started, the passenger detector 131 of the passenger protection apparatus 101 is activated to detect the passenger P1. The passenger detector 131 sends the gas supply selector 141 information on the sub-airbags 221a to 223n which may need to be deployed and information on the sub-airbags 221a to 221n which do not need to be deployed, based on the information on the detected position of the passenger P2.

The gas supply selector 141 previously designates the sub-airbags 221a to 221n which are destinations of the gas supply from the sub-inflator 111b, based or, the information sent from the passenger detector 131. Here, this designation is a previous preparation before the passenger detector 131 receives a collision detection signal from the collision detector 151, and therefore is not necessarily required.

Next, the collision detector 151 predicts a collision of the vehicle 1 with an object or detects a collision. Here, when the collision detector 151 predicts a collision of the vehicle 1 with an object or detects a collision, the collision detector 151 sends a collision detection signal to the main inflator 111a, the sub-inflator 111b, and the passenger detector 131.

Here, with the present example, the collision detector 151 predicts and detects a collision when the vehicle 1 moves and stops. However, this is by no means limiting, and the collision detector 151 may predict and detect a collision only when the vehicle moves. Alternatively, the prediction and detection of a collision during the stop of the vehicle 1 may be optionally performed.

Upon receiving the collision detection signal from the collision detector 151, the main inflator 111a supplies the gas to the main airbag 211. The main airbag 211 supplied with the gas from the main inflator 111a is deployed to entirely cover the seat 10 and the passenger P1 sitting on the seat 10.

Then, when the main airbag 211 extends to the lower portion of the seat bottom 10a of the seat 10, the gas in the main airbag 211 flows into the lock bags 231 via the communication paths provided between the main airbag 211 and the lock bags 231. When the gas flows into the lock bags 231 from the main airbag 211, the lock bags 231 deploys under the lower portion of the seat bottom 10a later than when the airbag 211 deploys. By this means, the lock bags 231 contact the seat bottom 10a to hold the airbag 121 to the seat 10.

Meanwhile, upon receiving the collision detection signal from the collision detector 151, the sub-inflator 111b supplies the gas to the sub-airbags 221a to 221n via the gas supply selector 141.

Then, upon receiving the collision detection signal from the collision detector 151, the passenger detector 131 detects the current position of the passenger P1, and sends the gas supply selector 141 a designation signal to designate the sub-airbags 221a to 221n to be deployed, based on the information on the detected position of the passenger P1.

Here, the passenger detector 131 detects the positions of the shoulders of the passenger P1, so that the sub-airbags

221a and 221b corresponding to the positions of the shoulders are designated to be deployed. That is, the passenger detector 132 sends the gas supply selector 141 the designation signal to designate the sub-airbags 221a and 222b to be deployed.

Here, with the present example, the passenger detector 131 detects the position of the passenger P1, and designates the sub-airbags 221a to 222n to be deployed based on the information on the detected position of the passenger P1. However, this is by no means limiting, and the passenger detector 131 detects the position of the passenger P1, and may send this information on the detected position to, for example, an ECU. Then, the ECU may designate the sub-airbags 221a to 221n to be deployed based on the information on the detected position, and send information on the designation to the gas supply selector 142. Alternatively, the passenger detector 132 may send the information on the detected position to the gas supply selector 141, and then the gas supply selector 141 may designate the sub-airbags 221a to 221n to be deployed, based on the information on the detected position.

Next, the gas supply selector 141 selects the destination of the gas supply based on the information indicating that the sub-airbags 221a and 221b are designated, sent from the passenger detector 131, and allows the gas from the sub-inflator 111b to be supplied to the sub-airbags 221a and 221b. Here, the gas supply selector 141 does not allow the gas to be supplied to the sub-airbags 221c to 221n which are not designated. That is, the gas supply selector 141 allows all the gas outputted from the sub-inflator 111b to be supplied to the sub-airbags 221a and 221b.

The sub-airbags 221a and 221b supplied with the gas from the sub-inflator 111b via the gas supply selector 141 are expanded and deployed. On the other hand, the sub-airbags 221c to 221n are not selected by the gas supply selector 141 and not supplied with the gas, and therefore are not deployed.

By this means, as illustrated in FIG. 4, when the collision detector 151 predicts or detects a collision of the vehicle 1 with an object, the main airbag 211 is deployed around the passenger P1, and the sub-airbags 221a and 221b are deployed between the shoulders of the passenger P1 and the main airbag 211. In addition, the lock bags 231 are deployed from the lower portion of the main airbag 211 and contact the lower portion of the seat bottom 10a of the seat 10.

Accordingly, the passenger P1 is firmly held in the main airbag 211 to protect the passenger P1 from the impact of a collision of the vehicle 1 with an object, and consequently it is possible to improve the function to protect the passenger P1. In addition, the main airbag 211 surrounds the passenger P1, and therefore can absorb the impact of a collision in all directions, so that it is possible to cope with various types of collisions.

Moreover, the gas supply selector 141 selects the sub-airbags 221a and 221b to be supplied with the gas from the sub-inflator 111b, from among many sub-airbags 221a to 221n, so that only the sub-airbags 221a and 221b are deployed. Therefore, it is possible to restrict the amount of gas supplied from the sub-inflator 111b, and consequently to reduce the volume of the sub-inflator 111b.

<Passenger Protection Apparatus for Bench Seat>

Figure 5:
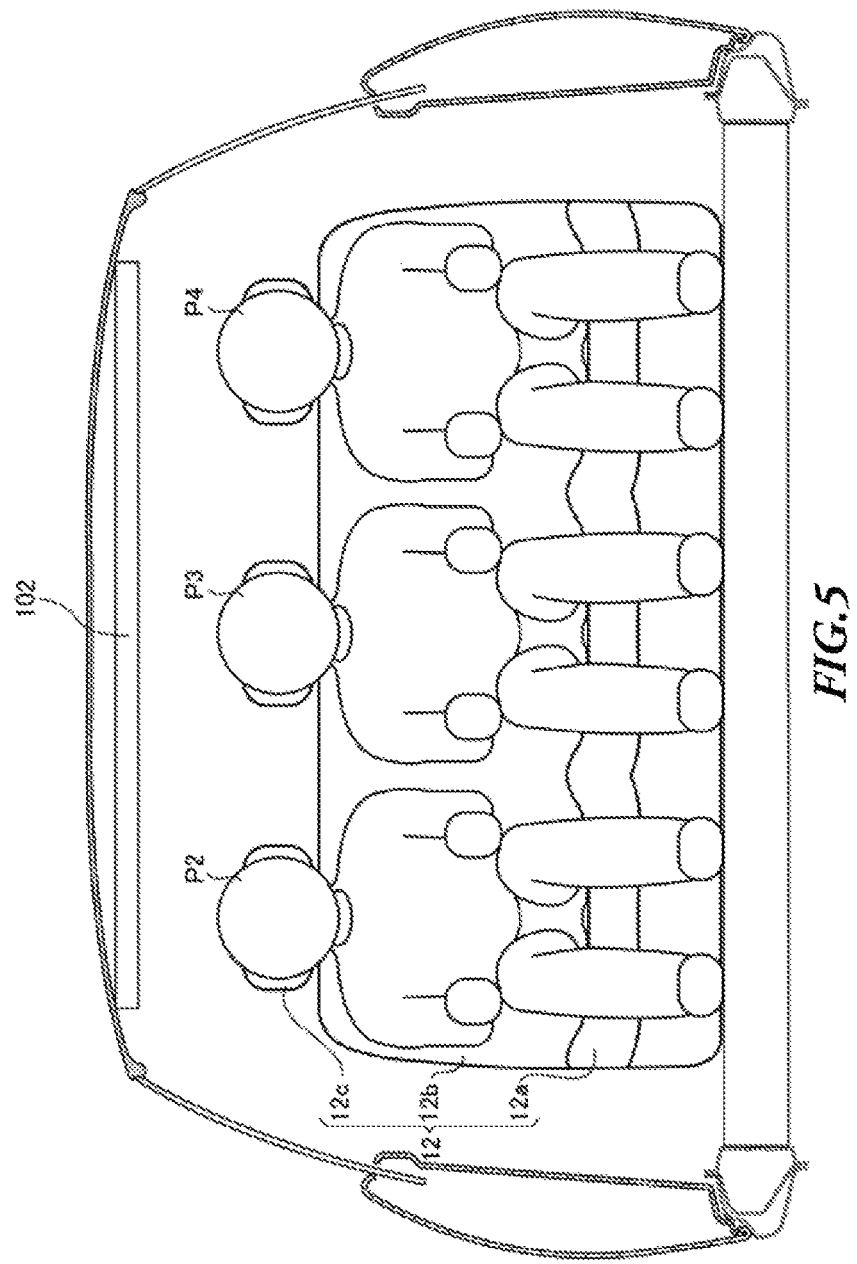
FIG. 5 is a cross-sectional view illustrating a vehicle equipped with the passenger protection apparatus according to another example of the present invention.
Figure 6:
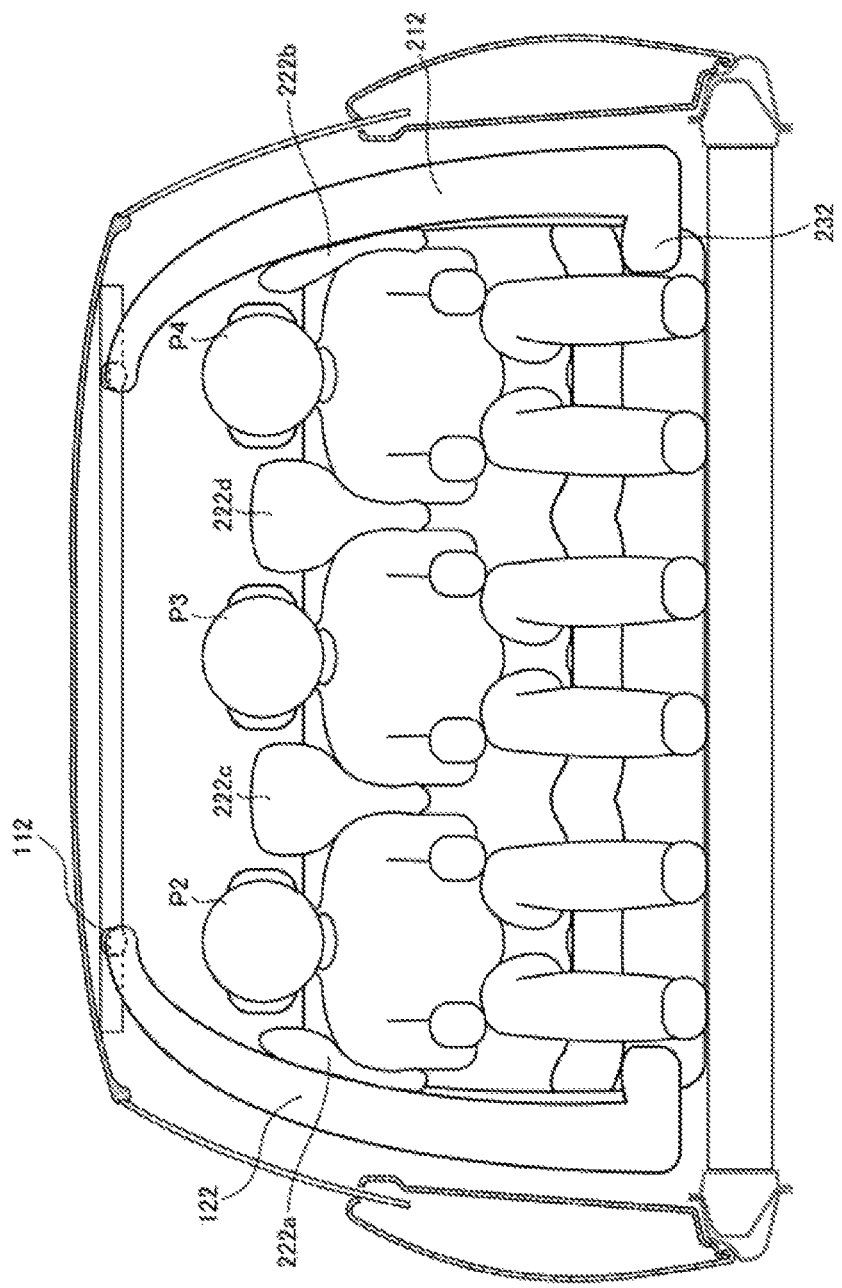
FIG. 6 is a cross-sectional view illustrating a state where the passenger protection apparatus according to another example of the present invention is actuated.

Next, another example of the passenger protection apparatus will be described. A passenger protection apparatus 102 according to the present example is applied to a bench seat 12 having a seat for a plurality of passengers. FIG. 5 is a cross-sectional view illustrating a vehicle equipped with the passenger protection apparatus according to the present example. FIG. 6 is a cross-sectional view illustrating a state where the passenger protection apparatus according to the present example is actuated.

As illustrated in FIGS. 5 and 6, the passenger protection apparatus 102 according to the present example includes an inflator 112 and an airbag 122 in the same way as the passenger protection apparatus 101 according to the above-described example. In addition, the passenger protection apparatus 102 includes a passenger detector, a gas supply selector and a collision detector which are not illustrated. These passenger detector, gas supply selector and collision detector are the same as the passenger detector 231, the gas supply selector 141 and the collision detector 151 according to the above-described example, and provided for sub-airbags 222 described later.

<Inflator 112>

The inflator 112 ignites explosives upon receiving a signal from the collision detector detecting an abnormality of the vehicle 1 such as a collision, and generates gas by the chemical reaction due to combustion, and then injects the gas into the airbag 122. The main function of the inflator 114 is the same as the inflator 111 according to the above described example. Meanwhile, the size of the airbag 122 supplied with the gas is larger than the airbag 121 according to the above-described example, and therefore an amount of gas injected into the airbag 122 by the inflator 112 is greater than that of the airbag 121. Moreover, the inflator 112 includes a main inflator for a main airbag 212 described later and a sub-inflator for the sub-airbags 222 described later.

<Airbag 122>

The airbag 122 has a pouch-shaped body into which the gas is injected by the inflator 112. The size of the airbag 122 is larger than that of the airbag 121 according to the above-described example. To be more specific, the size of the airbag 122 is large enough to cover three passengers P2 to P4.

When the airbag 122 is not actuated, it is compactly folded. The upper portion of the airbag 122 is supported by the passenger protection apparatus 102 at a position above the sitting position of the passenger P2 on the right of the bench seat 12, and at a position above the sitting position of the passenger P4 on the left of the bench seat 12.

The airbag 122 includes the main airbag 212, the sub-airbags 222, and lock bags 232. When the main airbag 212 having a pouch-shaped body deploys and expands, the size of the pouch-shaped body is large enough to cover three passengers P2 to P4 sitting on the bench seat 12.

The plurality of sub-airbags 222 are provided in the hollow main airbag 211 along the inner wall surface of the main airbag 211. Like the sub-airbags 221 according to the above-described example, the sub-airbags 222 are supplied with the gas from the sub-inflator. Here, the gas supply selector selects the sub-airbags 222 and allows the gas to be distributed among the selected sub-airbags 222, so that the sub-airbags 222 are deployed individually.

Here, the sub-airbags 222 includes the sub-airbags 222a to 222d, and other sub-airbags (not shown). The sub-airbag 222a is provided to deploy between the right shoulder of the passenger P2 and a door located on the right side of the rear seat of the vehicle 1. The sub-airbag 222b is provided to deploy between the left shoulder of the passenger P4 and a door on the left side of the rear seat of the vehicle 1. The sub-airbag 222c is provided to deploy between the left shoulder of the passenger P2 and the right shoulder of the passenger P3. The sub-airbag 222d is provided to deploy between the left shoulder of the passenger P3 and the right shoulder of the passenger P4.

Each of the lock bags 232 has a pouch-shaped body protruding inward from the lower portion of the main airbag 212. One of the lock bags 232 is provided from the lower portion of the main airbag 212 on the right side, and the other of the lock bags 232 is provided from the lower portion of the main airbag body 212 on the left side. Here, the lock bags 232 may not necessarily be provided from the lower portion of the main airbag 212 on the right and left sides, but may be provided on either side. Otherwise, the lock bag 232 may be provided each between the passengers (P2 to P4). Otherwise, one or more lock bags 232 may be provided in the front-to-back direction, in front of or behind the main airbag 212, or obliquely with respect to the main airbag 212. Otherwise, the lock bags 232 may be provided at the level of a head 12c of the bench seat 12 and contact the head 12c to hold the airbag 322.

The main airbag 212 and the lock bags 232 communicate with each other via the communication paths. The gas injected from the inflator 112 flows into the main airbag 232, and then flows into the lock bags 232 from the main airbag 212 via the communication paths.

<Operation of Passenger Protection Apparatus 102>

Next, the operation of the passenger protection apparatus 102 when the vehicle 1 collides with an object will be described. In the passenger protection apparatus 102, upon detecting the passengers P2 to P4, the passenger detector sends the gas supply selector information on the sub-airbags 222a to 222d which may need to be deployed and information on other sub-airbags which do not need to be deployed. The gas supply selector previously prepares for the gas supply based on the information sent from the passenger detector.

Next, when the collision detector predicts a collision of the vehicle 1 with an object, the collision detector sends a collision detection signal to the main inflator, the sub-inflator, and the passenger detector.

Upon receiving the collision detection signal from the collision detector, the main inflator supplies the gas to the main airbag 212. When the main airbag 212 is supplied with the gas from the main inflator, the main airbag 212 deploys to surround the bench seat 12 and the passengers P2 to P4 sitting on the bench seat 12.

Then, when the main airbag 212 extends to the lower portion of the seat, bottom 12a of the bench seat 12, the gas in the main airbag 212 flows into the lock bags 232 via the communication paths provided between the main airbag 212 and the lock bags 232 to deploy the lock bags 232 under the seat bottom 12a later than when the main airbag 212 deploys. By this means, the lock bags 232 contact the seat bottom 12a to hold the airbag 122 to the bench seat 12.

Meanwhile, upon receiving the collision detection signal from the collision detector, the sub-inflator supplies the gas to the sub-airbags 222 via the gas supply selector.

Then, upon receiving the collision detection signal from the collision detector, the passenger detector detects the current positions of the passengers P2 to P4, and sends the gas supply selector a designation signal to designate the sub-airbags 222a to 222d to be deployed, based on the information on the detected positions of the passengers P2 to P4.

Then, the gas supply selector selects the destination of the gas supply based on the information indicating that the sub-airbags 222a to 222d are designated, sent from the passenger detector, and allows the gas from the sub-inflator to be supplied to the sub-airbags 222a to 222d.

By this means, as illustrated in FIG. 6, the main airbag 212 deploy to surround all the passengers P2 to P4. In addition, the sub-airbag 222a is deployed between the passenger P2 and the main airbag 212, and the sub-airbag 222b is deployed between the passenger P4 and the main airbag 212. The sub-airbag 222c is deployed between the passenger P2 and the passenger P3, and the sub-airbag 222d is deployed between the passenger P3 and the passenger P4. Moreover, the lock bags 232 are deployed from the lower portion of the main airbag 212 and contact the lower portion of the seat bottom 12a of the seat 12.

Therefore, it is possible to firmly hold the passengers P2 to P4 in the main airbag 212 without touching each other. Accordingly, it is possible to protect the passenger P2 to P4 from the impact of a collision of the vehicle 1 with an object, and consequently improve the function to protect the passengers P2 to P4. Moreover, since the main airbag 212 surrounds the passengers P2 to P4, it is possible to absorb the impact of a collision in all directions, and therefore to cope with various types of collisions.

Moreover, the gas supply selector selects sub-airbags 222a to 222d to be supplied with the gas from the sub-inflator, from among many sub-airbags 221a to 221d and other sub-airbags (not shown), so that only the sub-airbags 222a to 222d are deployed. Therefore, it is possible to restrict the amount of gas supplied from the sub-inflator, and consequently to reduce the volume of the sub-inflator.

As described above, with the above-described embodiments, the passenger protection apparatus 101, 102 includes the main airbag 211, 212 configured to deploy around the sitting position of the passengers P1 to P4, and the sub-airbags 221, 222 configured to deploy in the main airbag 211, 212 along the inner wall surface of the main airbag 211, 212. Therefore, the passengers P1 to P4 are surrounded and held in the main airbag 211, 212, and supported by the sub-airbags 221, 222 in the main airbag 211, 212. Consequently, it is possible to absorb the impact on the vehicle 1 in all directions, and therefore to cope with various types of collisions. As a result, it is possible to improve the passenger protection function.

In addition, with the above-described examples, the passenger protection apparatus 101, 102 includes the plurality of sub-airbags 221, 222, and the sub-airbags 221, 222 to be deployed are selected depending on the sitting positions of the passengers P1 to P4. Therefore, it is possible to firmly hold the passengers P1 to P4 at appropriate positions, and to deploy the sub-airbags 221, 222 with a reduced amount of gas. By this means, it is possible to reduce the volume of the inflator.

Furthermore, the passenger protection apparatus 101, 102 according to the above-described examples includes the lock bags 231, 232 configured to deploy inward from the lower portion of the main airbag 211, 212 after the main airbag 211, 212 deploys to contact the seat 10 (bench seat 12) to restrict the motion of the main airbag 211, 212. Therefore, the main airbag 211, 212 surrounding the passengers P1 to P4 is held, and therefore it is possible to absorb the impact on the vehicle 1 in all direction, and to cope with various types of collisions. As a result, it is possible to improve the passenger protection function.

Here, with the above-described examples, the seat 10 is provided to face the traveling direction of the vehicle 1. However, this is by no means limiting, and the seat 10 may face backward or sideways. In this case, the passenger protection apparatus 101, 102 entirely covers the seat 10, and therefore it is possible to surely protect the passengers P1 to P4.

The invention claimed is:

1. A passenger protection apparatus comprising:
an inflator configured to supply gas; and
an airbag configured to deploy to surround a sitting position of a passenger by the gas supplied from the inflator, one end of the airbag being supported on an upper portion of a vehicle,
the airbag comprising:
a main airbag configured to deploy around the sitting position of the passenger and down to below a seat level of the sitting passenger; and
at least one sub-airbag configured to deploy on an inner wall surface of the main airbag.

2. The passenger protection apparatus according to claim 1,
wherein there are a plurality of sub-airbags.

3. The passenger protection apparatus according to claim 2, further comprising a lock bag configured to deploy inward from a lower portion of the main airbag after the main airbag deploys.

4. The passenger protection apparatus according to claim 1, further comprising a lock bag configured to deploy inward from a lower portion of the main airbag after the main airbag deploys.

5. The passenger protection apparatus according to claim 1, further comprising a first and a second lock bag, with the first lock bag being configured to deploy inward from a lower portion of the main airbag after the main airbag deploys and under a first side of a passenger seat and the second lock bag being configured to deploy inward from a lower portion of the main airbag after the main airbag deploys and under a second side of the passenger seat.

6. The passenger protection apparatus according to claim 1 wherein the main airbag is configured as a conical pouch shaped body which diverges downward and outward from a tapered mounting location supported by the upper portion of the vehicle.

7. A passenger protection apparatus comprising:
an inflator configured to supply gas; and
an airbag configured to deploy to surround a sitting position of a passenger by the gas supplied from the inflator, one end of the airbag being supported on an upper portion of a vehicle,
the airbag comprising:
a main airbag configured to deploy around the sitting position of the passenger; and
a plurality of sub-airbags configured to deploy on an inner wall surface of the main airbag, and
the passenger protection apparatus further comprising:
a passenger detector configured to detect a position of the passenger; and
a gas supply selector configured to select at least one of the plurality of sub-airbags to be supplied with the gas from the inflator, on a basis of the detection by the passenger detector.

8. The passenger protection apparatus according to claim 7, further comprising a lock bag configured to deploy inward from a lower portion of the main airbag after the main airbag deploys.

9. The passenger protection apparatus according to claim 7 wherein the main airbag is configured as a conical pouch shaped body which diverges downward and outward from a tapered mounting location supported by the upper portion of the vehicle.

10. A passenger protection apparatus comprising:
an inflator configured to supply gas; and
an airbag configured to deploy to surround a sitting position of a passenger by the gas supplied from the inflator, one end of the airbag being supported on an upper portion of a vehicle,
the airbag comprising:
a main airbag configured to have a front wall region positioned between the passenger and a front of the vehicle, a first side wall region configured to extend between a first side wall of the vehicle and a first side shoulder region of the passenger, and a second side wall region configured to extend between a second side wall of the vehicle and a second side shoulder region of the passenger; and
a plurality of sub-airbags configured for deployment on inner wall surfaces of the main airbag in each of the front wall region, first side wall region and second side wall region; and
the passenger protection apparatus further comprising:
a passenger detector configured to detect a position of the passenger; and
a gas supply selector configured to select any one or more of the plurality of sub-airbags to be supplied with the gas from the inflator, on a basis of the detection by the passenger detector.

11. The passenger protection apparatus according to claim 10 wherein the main airbag is configured to deploy down to a level below the seat of the sitting passenger.

12. The passenger protection apparatus according to claim 10 further comprising a first and a second lock bag, with the first lock bag being configured to deploy inward from a lower portion of the main airbag after the main airbag deploys and under a first side of a passenger seat and the second lock bag being configured to deploy inward from a lower portion of the main airbag after the main airbag deploys and under a second side the passenger seat.

13. The passenger protection apparatus according to claim 10 further comprising a lock bag configured to deploy inward from a lower portion of the main airbag and after the main airbag deploys down to a level below the seat of the sitting passenger.

14. The passenger protection apparatus according to claim 13 wherein the inflator is further configured to include a main inflator and a sub-inflator with the main inflator feeding both the main bag and the lock bag, and the sub-inflator feeding the any one or more of the plurality of sub-airbags on the basis of the gas supply selector selection.

15. The passenger protection apparatus according to claim 10 wherein there is a row of the sub-airbags made up of sub-air bags that are positioned on each of the front wall region, first side wall region and second side wall region, and the sub-air bags that are positioned on each of the first side wall region and the second side wall region are configured to each extend downwardly to a maximum lower level that is aligned with an anticipated side shoulder and arm region of the passenger.

16. The passenger protection apparatus according to claim 10 wherein the main airbag is configured as a conical pouch shaped body which diverges downward and outward from a tapered mounting location supported by the upper portion of the vehicle.

* * * * *